March 7, 1967 P. S. IVANOV ET AL 3,308,096
METHOD OF CONTINUOUS MANUFACTURING OF A PHENOL-ALDEHYDE RESIN
Filed Aug. 23, 1965

3,308,096
METHOD OF CONTINUOUS MANUFACTURING OF A PHENOL-ALDEHYDE RESIN

Petr Sergeevich Ivanov, 70 Gazetnaia ul, Apt. 34, Nizhny Tagil, U.S.S.R., and Vladimir Mikhailovich Diomkin, 5/20 Staroroosskaia ul, Apt. 98, Leningrad, U.S.S.R.
Filed Aug. 23, 1965, Ser. No. 481,533
4 Claims. (Cl. 260—54)

This application is a continuation-in-part of Serial No. 57,865 filed September 12, 1960, and now abandoned.

The present invention relates to the production of synthetic resins, and more precisely is a novel method for continuously manufacturing phenol-aldehyde resins to be used as molding compositions, lacquers, adhesives and the like.

Currently only the batch process is used for the production of phenol-aldehyde resins in commercial practice. This method encompasses a number of subsequently accomplished technological operations, namely: the process of phenol-aldehyde polycondensation, drying the polycondensation reaction products and conversion of the molten resin obtained by drying into the solid state by cooling. When liquid resins are produced, the necessity of the last operation is avoided.

The process of polycondensation is accomplished by maintaining a fixed amount of reactants at an elevated temperature during a period of time sufficient to produce resinous polycondensation products and is carried out in a reactor provided with a steam jacket and a stirrer. The operation of drying, i.e., vaporisation of water, unreacted phenol and other volatile substances from the resinous polycondensation products, is effected ordinarily in the same vessel as that used for the polycondensation reaction. Drying being completed, the molten resin is discharged from the apparatus and is kept on a cooled surface, usually in a trough, for a length of time sufficient to convert the resin into the solid state.

The described method for producing phenol-aldehyde resins which is generally accepted, has some drawbacks inherent in batch processes, such as the lack of homogeneity of the final product and the difficulty of automation of the production process. Moreover, specific disadvantages of the latch process for manufacturing phenol-aldehyde resins are its low efficiency and, as a consequence, drying of the polycondensation products requiring many hours, as well as long duration and low level of mechanization of the operation of cooling the resin.

Therefore, many attempts were made to develop a continuous process of producing phenol-aldehyde resins. In most instances, however, these endeavours comprised only an improvement of the polycondensation process. When continuous processes for carrying out other operations of the production process were proposed in patent applications, they had substantial drawbacks. Probably in view of this, none of the claimed continuous processes for producing phenol-aldehyde resins were accepted for commercial use.

It was proposed, for instance, that drying the polycondensation products should be accomplished by flash vaporization. This method involves instantaneous evaporating of volatile substances in the resin, superheated under pressure, by applying a sharp reduction of the pressure. However, it is not difficult to show by calculations that the amount of heat that may be given up by the superheated resin during flash evaporation insures only a partial removal of volatile substances and is insufficient for producing solid resins containing desirable amounts of volatile components.

Methods for continuously drying the phenol-aldehyde resins which involve evaporation in a thin resin layer moving along a heated surface by gravity, were also claimed. Such methods are only modifications of the well-known method for evaporating solutions in a falling film. A considerable obstacle to their use in practice consists in a specific peculiarity of drying phenol-aldehyde resins, namely, the gradual fouling of heat exchange surface with a deposit of the infusible resin. This fouling is especially excessive when the velocity of travel of the resin along the heat exchange surface is low. As phenol-aldehyde resins, due to their high viscosity, move very slowly under the action of gravity, it is inexpedient to use the falling-film method of evaporating in order to dry these resins.

A possible modification of the method of drying resins involves evaporation in an apparatus such as "Luwa," "Sambaj" and the like. In such apparatus the resin spreads out in a thin layer over the heat exchanger surface and is moved along it by a mechanical device such as a high-speed stirrer. Considerable drawbacks inherent in such a method are the complicated design and small heat exchange surface of such apparatus relative to their volume, in addition to the considerable consumption of power in spreading out the resin in a film layer and moving this layer along the heat exchange surface.

It should be pointed out that in the batch process for producing phenol-aldehyde resins, not only the evaporation of water, phenol and other volatile substances is accomplished during drying, which lasts many hours, but also the chemical reaction of binding a substantial portion of phenol unreacted at the stage of polycondensation is carried out. If the process of drying is intensified and its duration is sharply reduced, losses of unreacted phenol are substantially increased. However, none of the previously proposed processes for producing phenol-aldehyde resins, whose object was to intensify the stage of drying offers a technological solution for reducing losses of phenol.

All the known processes for producing phenol-aldehyde resins envisage attaining the maximum possible degree of conversion of the starting reactants during the polycondensation reaction. Only in this case can the highest efficiency of production be attained. However, at the same time the rate of the polycondensation reaction is correspondingly reduced, as it is substantially dependent on the concentration of the reactants.

To convert the resin from the molten into the solid state, cooling a thin resin layer was suggested, the layer being spread out over the surface of a rotating drum cooled from inside, or other similar arrangement. Though this method solves the problem of continuously cooling the resin, a substantial disadvantage of this method must be pointed out, namely, an efficient heat transfer is effected only by the inner surface of the layer adjacent to the drum. This results in a very small thickness of the layer of resin cooled, usually not exceeding 1–1.5 mm., and consequently results in a small quantity of the solid resin which may be produced per unit area of the cooling surface. However, when cooling is effected in such a manner, the resin removed from the drum is highly comminuted, which contributes to the resin caking and gathering moisture during storage and transportation.

One of the objects of the present invention is to provide an improved continuous process for producing phenol-aldehyde resins which insures high velocity of drying, i.e., the removal of water, unreacted phenol and other volatile substances from the phenol-aldehyde polycondensation products.

Another object of the invention is to provide a continuous process for producing phenol-aldehyde resins, which enables prevention of increase in phenol losses despite the high velocity of drying.

Still another object of the invention is to provide a continuous process for producing phenol-aldehyde resins which permits of carrying out the phenol-aldehyde polycondensation at a high velocity, the degree of conversion of the starting reactants being low.

A further object of the invention is to develop a continuous process for producing phenol-aldehyde resins, which provides efficient removal of unreacted starting components from the phenol-aldehyde polycondensation products, and permits of producing a resin which contains no water and has a negligible amount of phenol despite the low degree of conversion of starting reactants at the stage of the polycondensation reaction.

Yet another object of the invention is to provide a continuous process for producing phenol-aldehyde resins which insures a considerable intensification of resin conversion from the molten to the solid state.

Other objects and advantages of the invention will be apparent from the description given below and the accompanying flow sheet diagram.

Broadly, the invention involves:

Carrying out the polycondensation reaction between a phenol and an aldehyde in the presence of a catalyst to attain a desired degree of conversion of starting reactants and to produce resinous polycondensation products having a desirable molecular weight;

Dividing the reaction mass obtained at the stage of polycondensation, taking advantage of the difference in densities, into the layer of resinous water insoluble polycondensation products, and the water layer;

Drying the resinous polycondensation products in an elongated passageway heated externally and having (1) a heat exchange area which must be sufficient to transfer to said products an amount of heat which permits of reducing, as the result of evaporation, the content of volatile substances in them to the desired level and (2) a pressure differential at the inlet and outlet of the passageway so as to insure the travel toward the outlet of the passageway of vapors of volatile substances liberated in the passageway from the resinous products by heating, said resinous products being introduced into the passageway in such amount per unit time that the travel velocity of the vapors of volatile substances is sufficient to spread the resinous products in a layer over the inner walls of the passageway and to move this layer along said passageway due to the friction between the liquid and vapor phases, said velocity being necessarily at least 15 m. per sec.;

Separating the vapors of volatile substances from the molten resin as the result of the considerable decrease in the velocity of the vapor stream;

Cooling and condensing the vapors of volatile substances which are evolved from the resinous products at the drying stage;

Recycling the produced condensate, which is an aqueous solution of unreacted starting components, to the polycondensation stage for use as raw material; and Cooling the molten resin to convert it into the solid state in a thin layer on the surface of a rotating drum, the resin layer to be cooled being kept in direct contact with the cooling liquid.

For a better understanding of the present invention by those skilled in the art, the illustrative drawings are appended, in which.

The continuous production process which is provided by the invention may be applied to produce phenol-aldehyde resins to be used as molding compositions, abrasives, molds for shell-casting, etc. As phenolic raw material for the polycondensation reaction, there may be used phenol, cresol and mixtures of its isomers, xylenol or mixtures of its isomers, a mixture of various homologues of phenol, which is known in practice as tar acids, and dihydric phenols and mixtures thereof. As aldehyde, there may be employed formaldehyde, commonly used as 37% aqueous solution, various polymers of formaldehyde, for instance, paraformaldehyde, hexamethylenetetramine, acetaldehyde and furfural. Mixtures containing both resin-forming components may also be used. As catalysts for the polycondensation reaction, there may be used sulfuric acid, oxalic acid, hydrochloric acid, sodium hydroxide, ammonium hydroxide and a number of other acids, bases and salts.

Figure 1:
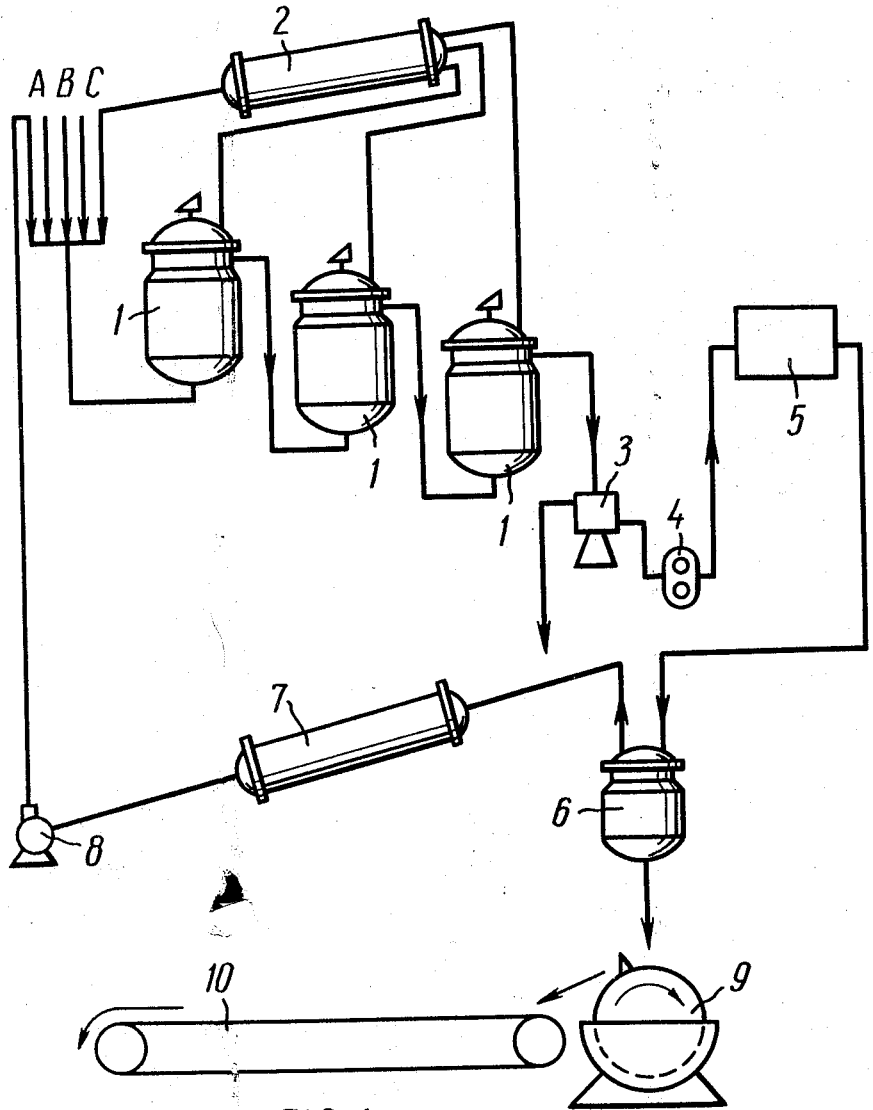
FIGURE 1 shows a schematic diagram of the plant.

The continuous process for producing phenol-aldehyde resins is illustrated in the diagrammatical flow sheet and can be described as follows:

Starting materials for the phenol-aldehyde polycondensation may be fed into the reaction vessel separately by means of dosage pumps which make it possible to control consumption of each component so as to maintain it at a constant level. It is also possible to feed the premixed components continuously into the reaction vessel. The only condition is that accurately controlled amounts of each of the starting components enter the reaction vessel continuously. Supply means for phenol (A), aldehyde (B) and catalyst (C) are not shown in the appended drawing (FIG. 1).

The polycondensation reaction is effected in a vessel of continuous action, which is a plurality of reaction vessels 1 connected in series. Each vessel of this plurality is equipped with an anchor stirrer and a steam jacket. The reaction is carried out under atmospheric pressure and at the boiling temperature of the reaction mass. Vapors of volatile substances, liberated during boiling enter reflux condenser 2, the condensate therefrom returning into the first reactor of the plurality of reactors 1.

It should be pointed out that other reaction apparatus such as externally heated coils may also be used to perform this invention. For carrying out the polycondensation reaction it is essential only to attain a desired degree of conversion of starting reactants and produce resinous polycondensation products having a desirable molecular weight.

The desired degree of conversion of the starting components should be understood as meaning such a degree of conversion of a phenol material and an aldehyde as is most expedient from the economical points of view. However, it is necessary to take into account that the described method for producing phenol-aldehyde resins perments of attaining high efficiency even when the degree of conversion of starting components is relatively low, as a substantial portion of phenol unreacted at the stage of polycondensation is liberated at subsequent stages of the process and recycled to the reaction zone as phenolic raw material.

As the reaction proceeds at a higher rate when the degree of conversion is low, other operating conditions being the same, the indicated technological solution of the problem permits of carrying out the polycondensation of a phenol with an aldehyde at a higher velocity, than is possible by applying other methods for producing phenol-aldehyde resins, which do not provide for recycling unconverted starting reactants.

The reaction mass produced at the polycondensation stage is continuously separated by means of centrifuge 3 into an aqueous layer and a layer consisting of resinous polycondensation products which are insoluble in water. The aqueous layer is discarded as waste.

We have found that in conditions of equilibrium distribution of phenol or its homologues between the layer of resinous phenol-aldehyde polycondensation products and the aqueous layer, the phenol concentration in the resinous products is from 3 to 4 times higher than its concentration in the water layer. After separating the reaction mass, the resinous products contain a substantial portion of unreacted phenol amounting from 85 to 90%, while only a negligible portion of unconverted phenol remains in the aqueous layer. Therefore, removal of the water layer does not involve serious losses of unreacted phenol.

Separating centrifuge 3 provides a high rate and high efficiency of separating the reaction mass into two layers. However, other appliances, such as settlers of continuous action, for instance, a Florence flask, may also be used to realize this invention, advantages being the simplicity of design and the possibility of accomplishing the separation of layers without additional application of power.

Resinous polycondensation products, leaving separating centrifuge 3, are continuously fed by means of pump 4 into evaporator 5.

We have found that when resinous polycondensation products are continuously passed through an elongated passageway, which is externally heated, flow conditions of resinous products are dependent on the velocity of movement of the vapors of volatile substances which are evolved from the polycondensation products when heated, and travel together with these products towards the outlet end of the passageway.

Figure 2:
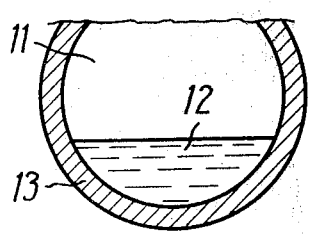
FIGURES 2, 3 and 4 illustrate the dependence of the flow conditions of the liquid phase on the travel velocity of the vapor phase in a passageway of round section.
Figure 3:
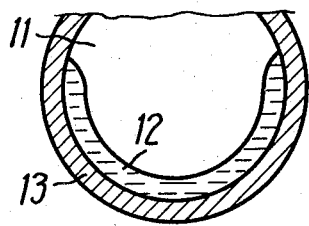
Figure 4:
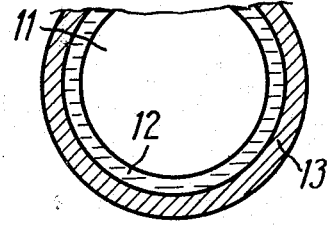

When velocities of vapor phase 11 are low (not more than 5 m. per sec.) liquid polycondensation products 12 flow along the lower part of the cross-sectional area of passageway 13, and the vapors of the volatile substances move over the liquid (FIG. 2). When the velocity of the vapor phase is increased (from 5 to 15 m. per sec.), the surface of the liquid is curved and the edges of the liquid stream creep along the walls of the passageway (FIG. 3). The critical travel velocity of the vapor phase (15–30 m. per sec.) being attained, the edges of the liquid stream coincide, and then the liquid moves along the inner walls of the passageway as a film layer (FIG. 4). The vapor phase travels through the central part of the passageway, retaining the liquid film on the walls and moving the liquid along the passageway due to friction.

In accordance with this invention the process of drying resinous polycondensation products is effected in such a way that these products are passed only once through an elongated passageway which is externally heated, the polycondensation products being fed into the passageway in such an amount per unit time that flow velocity of the vapor phase in the passageway reaches at least 15 m. per sec.

If the capacity of the evaporator is preset, the cross-sectional area of the passageway must be so selected that the travel velocity of the vapors of volatile substances which are evolved in the passageway due to heating through the walls of the passageway, amounts to at least 15 m. per sec.

To evaporate a desired amount of volatile substances from the resinous polycondensation products, the area of the passageway which is to be heated, and the temperature of the heating agent must be sufficient to transfer a required amount of heat to the resinous polycondensation products.

The resinous polycondensation products, fed by pump 4, continuously enter the passageway of evaporator 5 and, moving along it, are quickly heated until their boiling point is reached. The pressure differential at the inlet and outlet of the passageway being maintained, vapors of volatile substances which are evolved, and polycondensation products which are forced along by these vapors, travel towards the outlet end. As the polycondensation products travel along the passageway, the amount of vapors evolved from them is increased, and the velocity of the vapor phase is accelerated respectively. At the same time the edges of the flowing stream of resinous polycondensation products creep gradually along the walls of the passageway, and the flow conditions of the polycondensation products approximate to an increasing degree the flow conditions in a film. If it is necessary to decrease the thickness of the film in order to intensify the drying process, the amount of resinous polycondensation products, fed per unit time into the passageway of the evaporator, may be decreased. However, the amount of vapors of volatile substances which are liberated in the passageway per unit time also decreases, and their travel velocity decreases respectively. To compensate for decreasing the amount of evolved vapors and to attain a velocity of the vapor phase, which might provide flow conditions of resinous polycondensation products characteristic of flow in a film, it is necessary to feed continuously into the passageway of the evaporator gaseous substances, such as air, steam, nitrogen and the like, simultaneously with the resinous products. In this case the amount of resinous products and gas which are fed into the evaporator per unit time should be such that the velocity of the vapor-gaseous phase in the passageway be at least 15 m. per sec.

The flow conditions in the film of resinous polycondensation products provide good conditions for heat exchange and for removing volatile substances. This results in a sharp decrease in the drying time which usually does not exceed one minute. Moreover, the process of drying proposed herein provides a more complete removal of unconverted phenol in polycondensation products than the batch process.

From evaporator 5 the molten resin and the vapors of volatile substances are conveyed into heated tank 6, the main purpose of which is to separate the molten resin from the vapors of volatile substances. Vapors of volatile substances, issuing from tank 6, continuously enter tubular condenser 7, where they are liquefied.

If a substantial intensification of the process of drying is effected, a greater portion of phenol, which failed to react at the polycondensation stage, evaporates from the resin, which may lead to a substantial increase in phenol losses. At the same time, if the reaction mass is fed to the evaporator immediately after the polycondensation stage, the phenol content in the condensate produced from the vapors of the volatile substances evolved at the drying stage, may be rather low. Such solution is too dilute to use as phenolic raw material, and concentrating is economically inexpedient.

However, when the continuous process for producing phenol-aldehyde resins is realized according to the present invention, the phenol content in the condensate is fairly high, of the order of 35 to 40%. This permits its use as a phenol-containing starting material at the polycondensation stage, the increase in phenol losses being thus avoided. The causes of the high concentration of phenol attained in the condensate are as follows:

(a) Prior to drying, water is separated from the resinous polycondensation products. At the same time a great portion of unreacted phenol, amounting to 85–95%, remains in the resinous products and evaporates from them at the drying stage;

(b) A highly efficient process of drying, as provided by this invention, allows of evaporating from the resinous polycondensation products a considerably greater amount of unreacted phenol than is usually attainable. Moreover, drying is effected at such a high rate that chemical binding of the unreacted phenol is practically avoided at the drying stage;

(c) Recovering and recycling the unconverted phenol makes it possible to carry out the polycondensation reaction, when the degree of phenol conversion is relatively low. This also favours the increase in its concentration in the condensate.

From condenser 7 the condensate is continuously conveyed by means of pump 8 to the plurality of reaction vessels 1, where the polycondensation reaction is effected, thus replacing the corresponding amount of phenolic raw stock in the charge.

The molten resin issuing from tank 6 is continuously fed onto rotating drum 9, which is cooled from inside, and spreads along the surface of the drum in a uniform layer of the desired thickness. Moving together with the surface of the drum during its rotation, the resin layer passes through a bath of cooling liquid. The direct contact of the resin to be cooled with the cooling liquid makes it possible to greatly intensify conversion of resin from the molten to the solid state. The resin layer is continuously withdrawn from the surface of drum 9 in the form of a strip, both sides of which are well cooled. After removal from drum 9 the resin is fed onto conveyor 10 enclosed in a vented casing. During travel of the resin in strip form on conveyor 10, the temperature throughout the resin layer is equalized due to cooling of the central part; those negligible amounts of the cooling liquid which may be entrapped by the resin during its passage through the bath of cooling liquid evaporate and are removed in the venting system, and the final cooling of the resin is completed.

For a better understanding of the invention by those skilled in the art, the following examples of effecting the continuous process for producing phenol-aldehyde resins are given below by way of illustration:

Example 1

Molten phenol from a storage tank of 50 cu. m. capacity provided with heating coils to maintain the temperature at 60–80° C. is continuously fed by means of a centrifugal pump into the first vessel of a plurality of reaction vessels. Simultaneously a 37% aqueous solution of formaldehyde is continuously forced by a centrifugal pump into the first vessel of the plurality of reaction vessels from a storage tank of 50 cu. m. capacity. Moreover, the distillate, which is continuously produced at the stage of drying the polycondensation products, is continuously fed by means of a centrifugal pump into the first vessel of the plurality of reaction vessels. Simultaneously, the catalyst, which is a 50% aqueous solution of oxalic acid, is continuously forced by means of compressed air into the first vessel of the plurality of reaction vessels from a storage tank of 1.5 cu. m. capacity, equipped with a jacket to maintain the temperature at 80–90° C.

The consumption of components amounts to:

| | Kg. per hr. |
|---|---|
| Phenol | 338 |
| 37% formaldehyde solution | 277 |
| Distillate (40% solution of phenol) | 180 |
| 40% oxalic acid | 12 |

The molar ratio of starting components is 4.7 mols of formaldehyde per 6 mols of phenol.

The plurality of reaction vessels consists of three reactors of 600 liters capacity each connected in-series, and equipped with anchor stirrers rotating at a speed of 90 r.p.m. All these reactors are provided with jackets, the steam pressure required to provide a mild boiling of the reaction mass in the reaction vessels being automatically maintained therein. The reaction mass overflows by gravity from one into the next vessel of the plurality of reaction vessels, each preceding vessel being arranged somewhat higher than the following one.

The phenol-aldehyde polycondensation reaction is effected at a temperature of about 100° C. and under atmospheric pressure. Volatile substances evolved during the boiling of the reaction mass are cooled in a tubular condenser having a cooling surface of 5.5 sq. m. and are recycled to the reaction zone.

From the last vessel of the plurality of reaction vessels the reaction mass is continuously discharged at the rate of 807 kg. per hour. This mass continuously enters a separating centrifuge to separate water from the resinous polycondensation products. The centrifuge used to separate water has a rotor consisting of 50 conical plates about 220 mm. high and 350 mm. in diameter, at the base, and rotating at a speed of 4500 r.p.m. Water separated from the reaction mass at the rate of 259 kg. per hour is conveyed to a special plant to reduce the content of noxious substances to the prescribed level.

The resinous polycondensation products issuing from the centrifuge at the rate of 548 kg. per hour are continuously fed by a gear pump to the evaporator.

The evaporator is composed of a plurality of steel tubes of 60 mm. inner diameter connected in series, the total length of tubing being 37 m. The tubes are enclosed in a common shell. Steam is introduced into the shell of the evaporator under a pressure of 6 atm.

Resinous polycondensation products heated in the evaporator evolve vapors of volatile substances, which move at a rate of 20 m. per sec. towards the outlet of the evaporator. The pressure differential required to move the vapors and which is equal to the loss in pressure resulting from overcoming the aerodynamic resistance of the evaporator, is provided by creating a small positive pressure at the evaporator inlet by means of the pump feeding the polycondensation products to be dried, the outlet of the unit communicating with the atmosphere.

Resinous phenol-aldehyde polycondensation products are spread by the vapors of volatile substances over the inner surface of the evaporator pipes as a film having an annular cross-section, and travel at a high velocity along the pipes. The temperature of the resin at the drying stage reaches 140° C. The length of time the resin is in the evaporator is about 40 seconds.

From the evaporator the molten resin, which was completely dried, enters, at the rate of 368 kg. per hour, a vapor separator of 100 liter capacity and equipped with a stream jacket to maintain the resin in the molten state. Vapors of volatile substances condense in a tubular condenser having a cooling surface of 15 sq. m. The distillate produced is fed by means of a centrifugal pump at the rate of 180 kg. per hour into the plurality of reaction vessels as phenolic raw material.

The molten resin issuing from the separator is continuously poured out from above onto the surface of a rotating drum about 0.4 m. high and 0.5 m. in diameter. The rotational speed of the drum is 2 r.p.m. The drum is immersed to its shaft in a bath of running water. Moreover, the cooling water is introduced into the drum. The resin layer which is about 5 mm. in thickness performs a nearly complete revolution while on the drum passing through the bath of water, and after leaving the bath is cut with a blade as a plastic strip cooled on both surfaces but having an elevated temperature in its central part. After the resin has been cut from the surface of the drum, it is conveyed on a belt 8 m. in length. Meanwhile the temperature of the resin equalizes, water entrapped by the resin from the bath evaporates and the resin is completely cooled. The strip of resin breaks under its own weight as it leaves the conveyer and is comminuted when it falls into the bunker from a height of 1.6 m. The yield of commercial resin is 368 kg. per hour, which corresponds to a plant capacity of about 3000 tons per year.

The resin produced according to the process described in the example has an Ubbelodhe melting point of 103° C., viscosity 139 cps. (in 50% alcoholic solution) and free phenol content 2.7%.

Example 2

For producing the resin a mixture of synthetic phenol (monohydroxybenzene) and tar acids is used as phenolic stock. Hydrochloric acid is used as a catalyst.

The plant is similar to that described in the preceding example, except the following:

The catalyst, i.e., hydrochloric acid is continuously fed into the plurality of reactors from a steel tank of 100 liter capacity lined with polyethylene;

A Florence flask of 700 liter capacity and 800 mm. in diameter is used instead of a separating centrifuge for continuously dividing the reaction mass into the layer of resinous polycondensation products and the aqueous layer.

The starting reactants are fed into the plurality of reactors in the following amounts:

| | Kg. per hr. |
|---|---|
| Phenolic stock (previously prepared mixture of synthetic phenol and tar acids in 40:60 ratio) | 276 |
| Aldehyde (37% solution of formaldehyde) | 228 |
| Distillate (30% aqueous solution of phenol and its homologues) | 150 |
| Catalyst (20% hydrochloric acid) | 0.8 |

The conditions of the polycondensation reaction, drying of resinous polycondensation products and cooling the molten resin are similar to those indicated in Example 1.

The final product has an Ubbelodhe melting point of 110° C., viscosity by Ostwald viscometer 185 cps. (in 50% ethyl alcohol solution) and free phenol content of 2.9%.

*Example 3*

For producing the resin the following raw materials are used: a mixture of cresol isomers, furfural, a distillate which is produced at the stage of drying the resin and returned to the process, and ammonia water, used as a catalyst.

The reaction mixture is prepared as follows (in parts by weight):

| | |
|---|---|
| Cresol | 140 |
| Furfural | 140 |
| Distillate, i.e.: | |
| An aqueous solution of 10% of cresol and 15% of furfural | 30 |
| 25% ammonia water | 4 |

The reaction mixture is continuously fed into the reactor by means of a batcher pump at a rate of 90 liters per hour.

The reactor is a coil 65 m. long made of tubes with the inner diameter of 32 mm. heated externally by means of vapor under the pressure of 1–2 atm. The polycondensation reaction is effected at a temperature of 105° C. and under a pressure of up to 3 atm., said pressure being maintained by means of a pump, which feeds the mixture, and a throttle valve, mounted at the outlet of the coil.

From the reactor the reaction mass is directed into a vessel of 100 liter capacity provided with a reflux condenser and having a cooling surface of 2.5 sq. m. Then the reaction mass enters a separating centrifuge where resinous polycondensation products are separated from the aqueous layer.

The resinous polycondensation products are continuously fed by means of a gear pump into a drier, which is a plurality of tubes with the inner diameter of 32 mm., their total length being 12 m. These tubes are connected in series and enclosed in a common jacket. Vapor is fed into this jacket under a pressure of 4 atm.

Saturated vapor is continuously introduced into the tubes of the drier at a rate of 8 to 12 kg. per hour simultaneously with the polycondensation products.

The resin and the vapors of volatile substances, issuing from the drier, enter a vessel of 100 liter capacity where their separation is effected. The vapors of volatile substances are condensed in a condenser with the cooling surface of 6 sq. m., the distillate being used for preparing the reaction mixture.

The resin is cooled by means of a condenser with the surface of 4 sq. m. to 30–40° C.

The resulting resin has a viscosity by Ostwald viscometer of 1200 cps. The content of brominated ingredients amounts to 7%.

The resin is intended for producing lacquers, impregnation compounds and adhesives.

Although certain preferred embodiments of the invention have been disclosed for purpose of illustration, it will be understood that various changes and modifications may be made therein without departing from the scope and spirit of the invention.

We claim:

1. A continuous process for producing phenol-aldehyde resins, comprising polycondensation of a phenol with an aldehyde in the presence of a catalyst; separating the reaction mass into a first portion consisting of resinous water-insoluble polycondensation products and a second portion which consists principally of water; thereafter drying said first separated portion by continuously passing said separated polycondensation products through an externally heated elongated passageway said passageway having an inlet end maintained at a pressure slightly higher than the pressure at the outlet end of said passageway, thereby assisting said products to flow in said passageway from the relatively higher pressure inlet towards the relatively lower pressure outlet and along which these products travel together with the vapors of volatile substances liberated from said products as the result of heating the heat exchange area of said passageway being sufficient to transfer to said products an amount of heat which permits of diminishing as the result of evaporation the content of volatile substances in said products, the polycondensation products being fed into said passageway in such an amount per unit time and said passageway having a cross sectional area related to said amount so that the travel velocity of the vapors of volatile substances in the passageway reaches at least 15 m. per sec.; and separating the resin from said vapors of volatile substances.

2. A continuous process for producing phenol-aldehyde resins, comprising polycondensation of a phenol with an aldehyde in the presence of a catalyst; separating the reaction mass into a first portion consisting of resinous water-insoluble polycondensation products and a second portion which consists principally of water; thereafter drying said first separated portion by continuously passing said separated polycondensation products through an externally heated elongated passageway said passageway having an inlet end maintained at a pressure slightly higher than the pressure at the outlet end of said passageway, thereby assisting said products to flow in said passageway from the relatively higher pressure inlet towards the relatively lower pressure outlet, while simultaneously and continuously introducing into this passageway a gas selected from the group consisting of air, nitrogen, oxygen and steam, the polycondensation products and the gas being fed into said passageway in such an amount per unit time and said passageway having a cross sectional area related to said amount so that the travel velocity of the vapors-gaseous phase in the passageway is at least 15 m. per sec.; the heat exchange area of said passageway being sufficient to transfer to said products an amount of heat which permits of diminishing as the result of evaporation the content of volatile substances in said products, and separating the resin from said vapor-gaseous mixture.

3. A continuous process for producing phenol-aldehyde resins, comprising polycondensation of a phenol with an aldehyde in the presence of a catalyst, separating from the reaction mass produced at the polycondensation stage a layer consisting of resinous polycondensation products insoluble in water, separating and removing an aqueous layer from said resinous polycondensation products; thereafter drying said resinous polycondensation products effected by continuously passing said products through an externally heated elongated passageway, said passageway having an inlet end maintained at a pressure slightly higher than the pressure at the outlet end of said passageway, thereby assisting said products to flow in said passageway from the relatively higher pressure inlet towards the relatively lower pressure outlet and along which these products travel together with the vapors of volatile substances which are liberated from said products as the result of heating, the heat exchange areas of said passageway being sufficient to transfer to said products an amount of heat which permits of diminishing as the result of evaporation the content of volatile substances in said products, polycondensation products being fed into said passageway in such an amount per unit time and said passageway having a cross sectional area related to said amount so that the travel velocity of volatile substances in the passageway reaches at least 15 m. per sec., separating the resin from said vapors of volatile substances, cooling and liquefying said vapors of volatile substances, which are liberated from the resinous polycondensation products, using the produced condensate, which is an aqueous solution of unconverted starting components, predominantly a phenol, as raw material at the polycondensation stage.

4. A continuous process for producing phenol-aldehyde resins, comprising polycondensation of a phenol with an aldehyde in the presence of a catalyst, separating from the reaction mass produced at the polycondensation stage a first layer of resinous polycondensation products, which are insoluble in water and a second layer which consists principally of water, separating and removing the aqueous layer from said resinous products; then drying said resinous products by continuously passing said resinous polycondensation products through an externally heated elongated passageway said passageway having an inlet end maintained at a pressure slightly higher than the outlet end of said passageway, thereby encouraging materials in said passageway to flow from the relatively higher pressure inlet towards the relatively lower pressure outlet and along which these products travel together with the vapors of volatile substance liberated from said products as the result of heating the heat exchange area of said passageway being sufficient to transfer to said products an amount of heat which permits of diminishing as the result of evaporation the content of volatile substances in said products, said polycondensation products being fed into said passageway in such a manner per unit time and said passageway having a cross sectional area related to said amount so that the travel velocity of vapors of volatile substances in the passageway reaches at least 15 m. per sec., separating the resin from said vapors of volatile substances, cooling and condensing said vapors of volatile substances, using the produced condensate, which is an aqueous solution of unconverted starting materials, predominantly a phenol, as raw material at the stage of polycondensation, cooling the molten resin in a thin layer on the surface of a rotating drum to convert it into the solid state, the layer of resin to be cooled being kept in direct contact with the cooling liquid.

References Cited by the Examiner
UNITED STATES PATENTS

| | | | |
|---|---|---|---|
| 2,658,054 | 11/1953 | Coleman et al. | 260—57 |
| 2,750,354 | 6/1956 | Merriam | 260—57 |

WILLIAM H. SHORT, *Primary Examiner.*

H. E. SCHAIN, *Assistant Examiner.*